Aug. 9, 1938.　　H. A. HOKE ET AL　　2,126,388
SELF ALIGNING BEARING FOR CONNECTING RODS AND THE LIKE
Filed June 29, 1936　　2 Sheets-Sheet 2
FIG. VI.
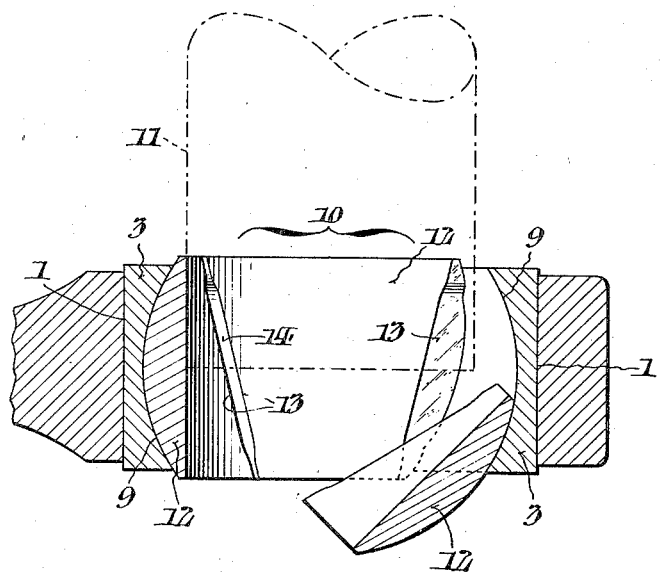
FIG. VII.
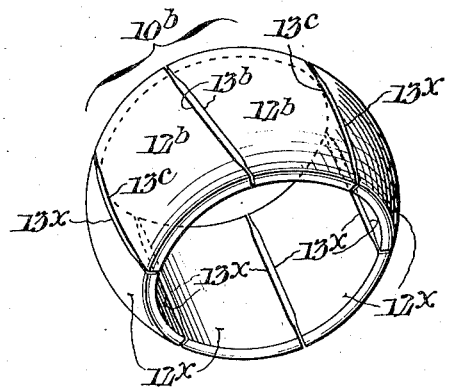
WITNESSES:
John C. Bergner
Woodrow Stevenson
INVENTORS:
Harry A. Hoke &
BY Harry H. Brenaman,
Fralley & Paul
ATTORNEYS.

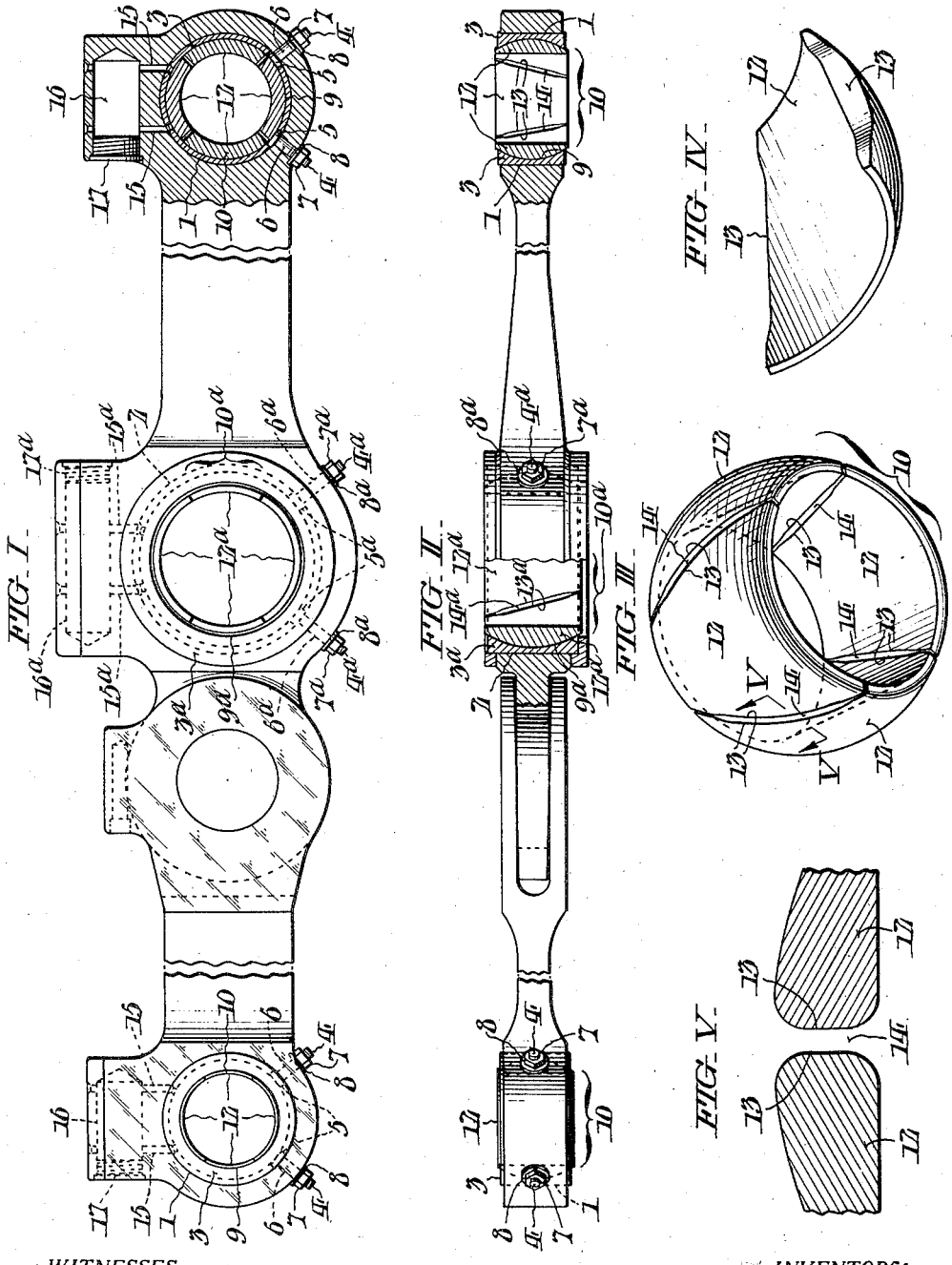

Patented Aug. 9, 1938

2,126,388

UNITED STATES PATENT OFFICE 2,126,388

SELF-ALIGNING BEARING FOR CONNECTING RODS AND THE LIKE

Harry A. Hoke and Harry A. Brenaman, Altoona, Pa.

Application June 29, 1936, Serial No. 87,902

8 Claims. (Cl. 308—72)

This invention relates to self-aligning bearings useful for the connecting rods of locomotives, etc.

In the operation of locomotives having three or more pairs of driving wheels, difficulty has been experienced heretofore with frequent breakage of the connecting rods due to bending strains induced by the lateral thrusts of the wheels, such strains increasing and becoming more potent with wear of the wheels, the axle journal boxes, etc.

In certain types of connecting rods extensively used on locomotives, fixed inserted bronze bushings are provided for the bearings at the ends of the rods, and floating (axially-free) cylindric bronze sleeves for the intermediate main bearing or bearings, said sleeves being usually made in four segments or sections and fitting hardened steel bushings pressed into the rods. While these floating sleeves compensate for lateral thrusts of the wheels, the connecting rods are not altogether immune to breakage on account of the fixed relationship of the end bearings. The fixed end bearings of such rods are moreover disadvantageous in that they wear unevenly. There is also another extensively used type of connecting rod, in which one piece spherical bearing sleeves engage correspondingly configured circumferential inner surfaces of two part bushings fixed in the rods. With a rod of the last described type, each renewal of any of the spherical sleeves entails removal of the corresponding bushings, which, after repeated replacements of the sleeve becomes loose and sloppy in the rod.

Our invention is directed toward overcoming the above and other drawbacks of ordinary bearing construction more especially as it relates to connecting rods. This objective we realize in practice, as hereinafter more fully disclosed, through provision of a self-aligning bearing comprising a one piece hardened steel bushing fixedly held in the bearing opening of the connecting rod or other support, and a spherical "floating" sleeve of bronze which fits into the bushing and which is composed of a plurality of segments of such configuration that they can be readily and quickly removed when worn and as readily replaced by new ones, without necessitating either the complete removal of the connecting rod from the locomotive or the removal of the bushing from said rod.

In the attached drawings, Fig. I is a fragmentary view, partly in side elevation and partly in longitudinal section of a locomotive connecting rod with bearings conveniently embodying our invention.

Fig. II is a fragmentary view showing the connecting rod partly in inverted plan and partly in longitudinal plan section.

Fig. III is a perspective view of one of the spherical bearing sleeves drawn to larger scale.

Fig. IV is a perspective view of one of the segmental components of the spherical sleeve shown in Fig. III.

Fig. V is a fragmentary detail sectional view on a still larger scale taken as indicated by the arrows V—V in Fig. III.

Fig. VI is a fragmentary sectional view likewise on a larger scale corresponding to the right hand end of Fig. II, showing how the segments of the spherical sleeves can be withdrawn from the bushings within the rod; and Fig. VII is a perspective view corresponding to Fig. III showing an alternative embodiment of our invention.

The connecting rod herein illustrated is generally of standard design and construction and provided with identical bearing openings 1 at opposite ends thereof, and with a similar but larger center bearing opening 2 at an intermediate point. Snugly fitting within the end bearing openings 1 are one piece hardened steel annular bushings 3 each of which is held against rotation by a pair of radial bolts 4. As shown, these bolts 4 have retaining heads 5 recessed in suitably allocated apertures in the bushings 3, and shanks 6 which pass through correspondingly allocated holes in the connecting rod, and which are threaded as conventionally indicated, for engagement by securing nuts 7 beneath which lock washers 8 are interposed.

Disposed within the bushings 3 and accurately fitting spherical internal surfaces 9 of the latter are floating spherical sleeves 10 whereof the bores correspond in diameter to that of the crank pins (whereof one such pin is partly shown at 11 in Fig. VI) on the outermost of the locomotive drive wheels. As shown in Fig. III the spherical sleeves 10 are composed of several symmetrically tapered segmental sections 12 (in this instance, four) which are exact counterparts of each other and which are alternately arranged so that the contiguous side edges 13 of each adjacent pair meet on a bias, i. e., in a line at an angle to the axis of the bearing.

By virtue of the described construction and arrangement, either of the spherical sleeves 10 can be removed from one side of the connecting rod without necessitating removal of the corresponding bearing bushing as heretofore, simply by withdrawing one of the segments, wide end foremost, by movement thereof in the arc of the sphere as shown in Fig. VI whereupon all the other segments can be withdrawn in like manner. This may be accomplished with the connecting rod lying flat or with the rod on the locomotive, provided that in the latter instance, said rod is moved outward from its normal position by a distance equal to half its width, also as shown in Fig. VI. By reversing the operation just described, the several components 12 of the sleeve 10 can obviously be removed with equal facility.

From Figs. II–IV it will be observed that the side edges 13 of the spherical sleeve segments are inwardly recessed intermediate their ends with resultant provision of intervals 14 for flow and distribution of lubricant between the outer and inner faces of the sleeve. Lubricant may be supplied to the bearings by gravity, for example through vertical ducts 15 which lead downwardly from reservoir cavities 16 in the connecting rod directly above the bearings. These cavities 16 are accessible for filling upon removal of the screw closure plugs indicated at 17, and may contain a fibrous packing capable of holding a considerable reserve supply of the lubricant.

Except for being larger, the construction of the center bearing of the connecting rod is exactly like that of the end bearings, and therefore, in order to preclude the necessity for duplicate description, all corresponding parts have been designated by the same numbers previously employed with the addition, however, in each instance, of the letter "a" for the purpose of distinction.

In the alternative form of our invention illustrated in Fig. VII the spherical sleeve 10b is composed of six segments 12b instead of four as was the case in the first embodiment. As shown, two of these six segments designated 12b are tapered and have correspondingly sloped contiguous side edges 13b which meet in a line at an angle to the bearing axis, and side edges 13c which extend parallel to each other and with said bearing axis. The other four segments designated 12x all have their opposite side edges 13x parallel with the axis of the bearing. It will be evident from the last described construction that, upon withdrawal of either one of the tapered segments 12b laterally wide end first, from the associated bushing in the connecting rod by movement thereof in the arc of the sphere, all of the other segments 12x can be likewise removed as in the first embodiment of our invention, without necessitating withdrawal of such bushing or requiring complete removal of the rod from the locomotive.

While we have herein shown and described our improved self-aligning bearing in association with a connecting rod, it can obviously be employed with attainment of advantages equal in all respects to those hereinbefore pointed out, for the journalling of rotating shafts or for the guidance of endwise shiftable rods. Furthermore, it is to be understood that our invention is not limited to the precise details of construction and arrangement herein disclosed by way of example, nor to any definite number of component segments for the spherical sleeves, such features being obviously subject to variation within the scope of the appended claims.

Having thus described our invention, we claim:

1. A self-aligning bearing for connecting rods and the like, comprising a spherical rotatively-floating pin-receiving sleeve fitting an annular opening with a continuous annular spherical surface in the rod, said sleeve being composed of a plurality of segments of which at least two are of longitudinally-tapered configuration and oppositely positioned end for end, so that upon axial shifting of the bearing until the center of the sleeve is in the plane of the end of the pin, the segments can be successively withdrawn from the front side of said opening by movement in the orbit of the sphere.

2. A self-aligning bearing for connecting rods and the like, comprising a spherical rotatively-floating pin receiving bearing sleeve to fit a continuous annular opening of correspondingly shaped cross section in the rod, said sleeve being composed of a plurality of counterpart longitudinally-tapered segments arranged in alternation and oppositely positioned end for end, so that upon axial shifting of the bearing until the center of the sleeve is in the plane of the end of the pin, the segments can be successively withdrawn from the front of said opening by movement in the orbit of the sphere.

3. A self-aligning bearing for connecting rods and the like, comprising a continuous stationary one piece bushing secured within an annular opening provided for it in the rod, and having a continuous spherical internal surface; and a spherical rotatively-floating pin-receiving bearing sleeve fitting within the bushing, said sleeve being composed of a plurality of segments of which at least two are of longitudinally tapered configuration alternatingly-arranged and oppositely positioned end for end, so that upon axial shifting of the bearing until the center of the sleeve is in the plane of the end of the pin, the segments can be successively withdrawn from the front of the bushing by movement in the orbit of the sphere.

4. A self-aligning bearing for connecting rods and the like, comprising a continuous stationary one piece bushing secured within an opening provided for it in the rod, and having a spherical internal surface; and a spherical rotatively-floating shaft-receiving sleeve fitting within the bushing, said sleeve being composed of a plurality of counterpart longitudinally tapered segments alternatingly arranged end for end, so that upon axial shifting of the bearing until the center of the sleeve is in the plane of the end of the pin, the segments can be successively withdrawn from the front of the bushing by movement in the orbit of the sphere.

5. A self-aligning bearing for connecting rods and the like according to claim 1, wherein the contiguous edges of the segments are inwardly recessed complementarily intermediate their ends to provide flow passages which facilitate distribution of lubricant between the outer and inner surfaces of the sleeve.

6. A self-aligning bearing for connecting rods and the like according to claim 1, wherein the contiguous edges of the segments are inwardly recessed complementarily intermediate their ends to provide flow passages which facilitate distribution of lubricant between the outer and inner surfaces of the sleeve; and including means for conducting lubricant to said sleeve.

7. A self-aligning bearing for connecting rods and the like according to claim 1, wherein the contiguous edges of the segments are inwardly recessed complementarily intermediate their ends to provide flow passages which facilitate distribution of lubricant between the outer and inner surfaces of the sleeve; and including a cavity in the connecting rod above the bearing constituting an oil reservoir and a duct leading from said cavity to the sleeve.

8. A self-aligning shaft bearing comprising a continuous one piece fixed annular member having a spherically-surfaced opening; and a spherical rotatively floating shaft receiving sleeve fitting within the opening of the fixed member with a working fit, said sleeve being composed of a plurality of counterpart longitudinally tapered segments arranged in alternation and oppositely positioned alternatively end for end, so that upon axial shifting of the bearing until the center of the sleeve is in the plane of the end of the shaft, the segments can be successively withdrawn from the front of the annular member by movement in the orbit of the sphere.

HARRY A. HOKE.
HARRY A. BRENAMAN.